May 12, 1964   J. A. ADLOFF   3,132,830
RESILIENT MOUNTINGS FOR MOTOR VEHICLE POWER UNITS
Filed July 14, 1961   2 Sheets-Sheet 1
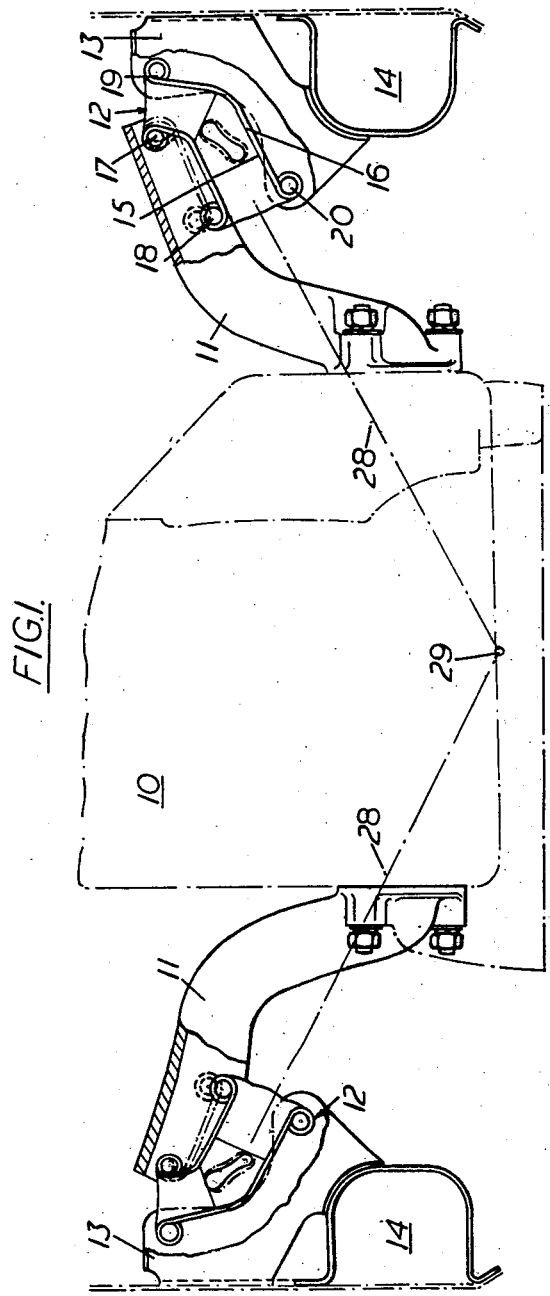
Inventor
Jakob August Adloff
BY
D. D. McGraw
Attorney

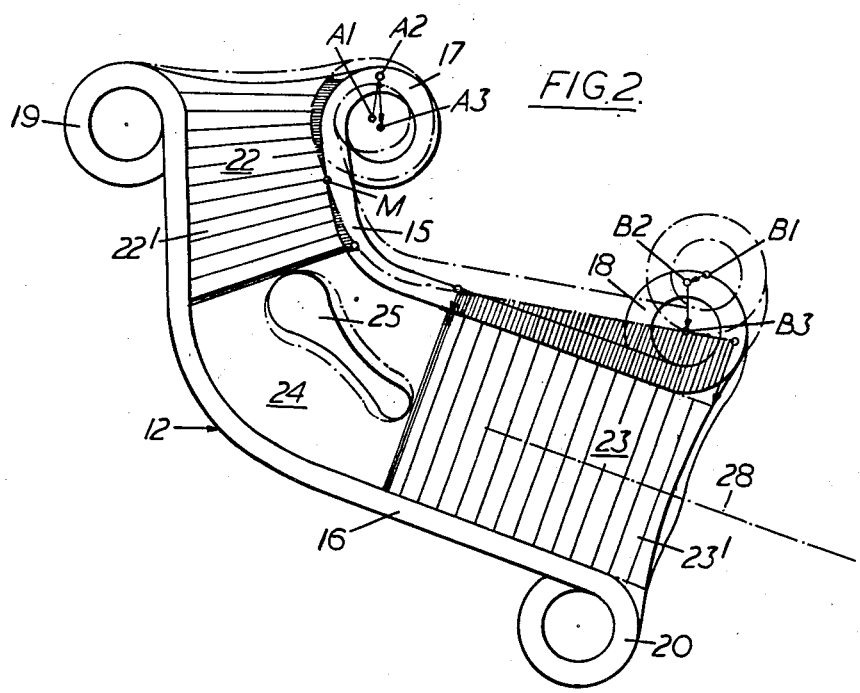

United States Patent Office 3,132,830
Patented May 12, 1964

3,132,830
RESILIENT MOUNTINGS FOR MOTOR VEHICLE POWER UNITS
Jakob August Adloff, Mainz-Gonsenheim, Germany, assignor to General Motors Corporation, Detroit, Mich., a corporation of Delaware
Filed July 14, 1961, Ser. No. 124,131
10 Claims. (Cl. 248—9)

This invention relates to resilient mountings for motor vehicle power units and in particular to resilient mountings intended to be secured between the power unit and a part of the vehicle frame at each side of the power unit.

It is customary to mount the power unit (comprising the engine, clutch and gear box) of a motor vehicle on the vehicle frame by means of three resilient mountings comprising blocks of rubber bonded to metal members which are secured to the engine and the vehicle frame, two mountings being arranged at opposite sides of the engine so as to take the major portion of the static load of the engine and a third mounting, which takes only a small proportion of the static load of the engine, being mounted at the rear of the engine in the central longitudinal plane of the vehicle.

From one aspect, the present invention is a resilient mounting for a motor vehicle power unit, and from another aspect the invention is a resilient mounting installation for a motor vehicle power unit.

According to the invention, a resilient mounting for a motor vehicle power unit comprises a pair of blocks of elastomeric material mounted between and bonded to a pair of metal plates so that the blocks are inclined at angles to each other in a common plane which includes the longitudinal axes of the blocks and plates.

Each plate has at opposite ends thereof connector members adapted to be secured to further connector members on the engine and the vehicle frame and in a resilient mounting installation for a vehicle power unit two such resilient mountings are arranged at opposite sides of the engine and have the connector members of their respective pairs of plates secured to the engine and to the vehicle frame.

Preferably a third block of elastomeric material is mounted between the ends of said pair of blocks and is bonded to said plates; and said third block preferably has a cavity therein.

The connector members are arranged so that when they are secured to the connector members on the engine and the vehicle frame one plate has to be pivotally moved about a point intermediate its ends relative to the other plate so as to result in a compressive pre-stressing of said one block, the other block being substantially unstressed; such pre-stressing is such as to create a non-uniform deformation of a cross-sectional portion of said one block so as to result in a substantially V-shaped stress diagram therein. The static load of the power unit supplements said pre-stressing and as a result the mounting has a highly curved elasticity characteristic. Preferably said pre-stressing is such that a cross-sectional portion of said one block is loaded in the progressive region of its elasticity characteristic, its vibration and shock-absorbing action thereby being improved.

The third block assists in limiting the amplitude of vibrations and acts as a buffer block.

It is preferred that the mountings of the mounting installation are arranged above the axis of the centre of gravity of the power unit, said pre-stressed blocks having their longitudinal axes extending towards the axis of the centre of gravity transversely of the direction of travel of the vehicle.

The scope of the invention is defined by the appended claims; and the invention and the method by which it is to be performed are hereinafter particularly described with reference to the accompanying drawings in which:

FIGURE 1 is a part sectional front elevation of a resilient mounting installation for a motor vehicle power unit in accordance with the invention; and FIGURE 2 is a side elevation of one of the resilient mountings in the installation shown in FIGURE 1, the dotted lines indicating the mounting before installation in the vehicle and the full lines the mounting after installation; the shaded portions of the drawing show diagrammatically the deformation of, and the distribution of the stress in, the resilient members of the mounting after installation and as the result of the static load of the engine.

FIGURE 1 shows a motor vehicle power unit 10 to either side of which are secured support arms 11 which are wing-shaped and extend outwardly and upwardly from each side of the power unit. The extremities of the support arms 11 are connected by resilient mountings 12 with brackets 13 on the vehicle frame 14, each mounting 12 consisting of two plates 15, 16 the ends of which are turned over to form eyes 17, 18, 19, 20, which constitute connector members, the eyes 17, 18 being secured to further connector members on the support arms 11 and the eyes 19, 20 being secured to further connector members on the brackets 13. The connector members on the support arms and brackets are conveniently in the form of apertured portions of the support arms and brackets, bolts being passed through the eyes and the openings in the support arms and the brackets, and secured by nuts (not shown).

As shown in FIGURE 2, each resilient mounting 12 has two blocks 22, 23 of rubber or like elastomeric material which are mounted between and bonded at their opposite faces to the plates 15, 16, said plates being angled intermediate their ends as shown so that the blocks 22, 23 are inclined at angles to each other in a common plane which includes the longitudinal axes of the blocks and plates.

Mounted between the two blocks 22, 23 and also bonded at its opposite faces to the plates 15, 16 is a further block 24 of rubber or like elastomeric material which has therein a cavity 25 which is conveniently, as shown, of approximate dumb-bell shape.

When the resilient mountings 12 are installed on the vehicle the longitudinal axes 28 of the blocks 23 extend towards the axis 29 of the centre of gravity of the power unit 10 (FIGURE 1); the arrangement may also be such that the longitudinal axes 28 intersect below the axis 29. In the arrangement shown cross-sectional planes 23' through the block 23 are inclined at about 20° to the vertical and cross-sectional planes 22' through the block 22 lie substantially in a horizontal plane.

When the mounting is installed the plate 15, as a result of the relative positions of the eyes 17, 18, 19, 20 and the connector members on the support arms 11 and the brackets 13, is pivotally moved relative to the plate 16 (in a clockwise direction as viewed in FIGURE 2) about a point M intermediate the ends of the plate 15, the rubber blocks 22, 23 being deformed and the centre of the upper eye 17 being moved from the position A1 to the position A2 and that of the lower eye 18 being moved from the position B1 to B2. Such pivotal movement of one plate relative to the other results in a pre-stressing of the block 23 and such pre-stressing is supplemented by the action of the static load of the engine which results in a movement of the position of the centre of the upper eye 17 from A2 to A3 and of the centre of the lower eye from B2 to B3, the final position of the plate 15 being shown in full lines, and its original position being shown by the broken lines, in FIGURE 2.

The shade lines on the drawing show the non-uniform deformation, and accordingly the non-uniform pre-stressing of the block 23 at cross-sectional planes 23' thereof, and also the non-uniform but relatively small deformation of the cross-sectional planes 22' of block 22.

It will be seen from FIGURE 2 that the block 23 after installation of the mounting has a progressively increasing deformation, and accordingly stress pattern, the compressive stress increasing from the inner end to the outer end of the block 23. By appropriate shaping and dimensioning of the block a curved stress diagram can be attained. For example, in the embodiment shown the block 23 in the free state is somewhat trapezoidal in shape and when deformed to the position at B3 of the lower eye of plate 15, it becomes substantially rectangular. This produces a V-shaped stress diagram. Obviously, to one skilled in the art, it would be a simple matter to shape the block with a slightly curved surface which would deform under plate 15 to produce a curved stress diagram. A particularly effective damping action of the mounting is achieved if the upper portion of the block 23 is pre-stressed such that a region of progressive elasticity is formed. That is, the elasticity characteristic progressively increases in the planes 23' which are compressed the greatest and isolation is most effective in these regions. In the present embodiment the cross sectional portion being deformed is triangular; illustrated here by the V-shaped stress diagram.

The deformation of the block 22, as shown in FIGURE 2, is very small and for practical purposes can be disregarded, the stress induced in this block by the pivotal movement of the plate 15 consisting of two substantially equal stresses one of which is a tensile stress and the other of which is a compressive stress.

The third rubber block 24, owing to the cavity therein, remains substantially unstressed by the pivotal movement of the plate 15 relative to the plate 16. It will be noted that under static load there is substantially no shear stress.

Under vertically acting forces, for example jolts when the vehicle moves over an irregular road surface, the compressive pre-stress of the rubber blocks 23 is increased or decreased; in addition, the rubber blocks 22 are stressed in shear, with the result that the elasticity constant of the mounting progressively changes. Very severe vertical impacts are absorbed by the rubber blocks 24 and may result in closing of the cavities 25.

Forces acting horizontally and transversely of the direction of travel, for example centrifugal forces, stress the rubber blocks 23 substantially in shear only, and the rubber blocks 22 in compression or tension. Under severe impacts one of the rubber blocks 24 will act like a stop. The combined action of the three rubber blocks thus ensures that the resilient mounting has a progressive elasticity characteristic.

I claim:

1. A resilient mounting for a motor vehicle power unit, comprising a pair of blocks of elastomeric material mounted between and bonded to a pair of angled metal plates so that the blocks are inclined at angles to each other in a common plane which includes the longitudinal axes of the blocks and plates, and a third block of elastomeric material mounted between said pair of blocks and bonded to said plates.

2. A resilient mounting according to claim 1, in which said third block has a cavity therein.

3. A resilient mounting installation for a motor vehicle power unit, including two resilient mountings respectively secured between opposite sides of the power unit and the vehicle frame, each said mounting comprising a pair of blocks of elastomeric material mounted between and having their respective opposite faces bonded to a pair of angled metal plates so that the blocks are inclined at angles to each other in a common plane which includes the longitudinal axes of the blocks and plates, each plate having at opposite ends thereof connector members respectively secured to further connector members on the vehicle engine and frame, said connector members being arranged so that their attachment to the further connector members of the engine and frame, and the static load of the engine, results in pivotal movement of one plate intermediate its ends relative to the other such as to create in said one block a compressive pre-stressing which is non-uniform from one end of the block to the other, and to leave the other block substantially unstressed; and a third block of elastomeric material mounted between said pair of blocks and bonded to said plates, said third block having a cavity therein.

4. A resilient mounting installation according to claim 3, in which said mountings are arranged above the centre of gravity of the power unit, said pre-stressed blocks having their respective longitudinal axes extending transversely of and intersecting the longitudinal axis of the engine through its centre of gravity.

5. A resilient mounting installation according to claim 3, in which said pre-stressing is such as to result in a V-shaped stressed diagram in said one block.

6. A resilient mounting installation according to claim 3, in which the longitudinal axis of said one block extends at approximately 20° to the horizontal, and the longitudinal axis of the other block extends substantially vertically.

7. A resilient mounting installation for a motor vehicle power unit comprising, a pair of mountings respectively secured between opposite sides of the power unit and the vehicle frame, each said mounting comprising a pair of blocks of elastomeric material mounted between and having their respective opposite faces bonded to a pair of angled metal plates so that the blocks are inclined at angles to each other in a common plane which includes the longitudinal axes of the blocks and plates, connector means attached to the power unit and frame and cooperating with each said plate to secure each mounting between the power unit and frame, said connector means being arranged so that one of said plates in each said pair is moved relative to the other plate when the power unit and frame are connected thereby initially pre-stressing said blocks, and upon assuming support of said power unit said pre-stressed condition being increased in one of said blocks leaving the other substantially unstressed.

8. A resilient mounting installation according to claim 7 in which said pre-stressed condition results in a V-shaped stress diagram for said one block.

9. A resilient mounting installation according to claim 7 in which said one block has a substantially trapezoidal shape in the unstressed condition.

10. A resilient mounting installation according to claim 7 in which said blocks in each said pair are substantially free of shear stresses under static loading conditions.

References Cited in the file of this patent
UNITED STATES PATENTS
2,162,714    Hamblin _____ June 20, 1939
FOREIGN PATENTS
1,178,264    France _____ Dec. 8, 1958